(12) United States Patent
Bulusu et al.

(10) Patent No.: US 8,448,002 B2
(45) Date of Patent: May 21, 2013

(54) CLOCK-GATED SERIES-COUPLED DATA PROCESSING MODULES

(75) Inventors: Ravi Bulusu, San Jose, CA (US); Shu-Jen Fang, Cupertino, CA (US); Srivatsan Varadarajan, Campbell, CA (US); Han Chou, Santa Clara, CA (US); Sandro Pintz, Menlo Park, CA (US); Aiyun Wang, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 646 days.

(21) Appl. No.: 12/101,082

(22) Filed: Apr. 10, 2008

(65) Prior Publication Data

US 2009/0259862 A1    Oct. 15, 2009

(51) Int. Cl.
*G06F 1/00*    (2006.01)
*H03M 7/34*    (2006.01)

(52) U.S. Cl.
USPC ............................................. 713/323; 341/50

(58) Field of Classification Search
USPC .................... 340/50; 713/320, 322, 324, 330, 713/340
See application file for complete search history.

(56) References Cited

U.S. PATENT DOCUMENTS

| | | | |
|---|---|---|---|
| 5,643,086 A | 7/1997 | Alcorn et al. | |
| 5,752,062 A | 5/1998 | Gover et al. | |
| 5,757,919 A | 5/1998 | Herbert et al. | |
| 5,815,154 A | 9/1998 | Hirschtick et al. | |
| 5,892,904 A | 4/1999 | Atkinson et al. | |
| 5,920,725 A | 7/1999 | Ma et al. | |
| 5,970,147 A | 10/1999 | Davis | |
| 5,978,484 A | 11/1999 | Apperson et al. | |
| 5,999,737 A | 12/1999 | Srivastava | |
| 6,016,474 A | 1/2000 | Kim et al. | |
| 6,157,618 A | 12/2000 | Boss et al. | |
| 6,266,416 B1 | 7/2001 | Sigbjørnsen et al. | |
| 6,330,008 B1 | 12/2001 | Razdow et al. | |
| 6,362,825 B1 | 3/2002 | Johnson | |
| 6,412,039 B1 | 6/2002 | Chang | |
| 6,668,325 B1 | 12/2003 | Collberg et al. | |
| 6,684,389 B1 | 1/2004 | Tanaka et al. | |
| 6,732,060 B1 | 5/2004 | Lee | |
| 6,901,582 B1 | 5/2005 | Harrison | |
| 6,943,800 B2 | 9/2005 | Taylor et al. | |
| 6,965,994 B1 | 11/2005 | Brownell et al. | |
| 7,016,972 B2 | 3/2006 | Bertram et al. | |
| 7,047,519 B2 | 5/2006 | Bates et al. | |
| 7,095,416 B1 | 8/2006 | Johns et al. | |
| 7,107,484 B2 | 9/2006 | Yamazaki et al. | |
| 7,173,635 B2 | 2/2007 | Amann et al. | |

(Continued)

OTHER PUBLICATIONS gDebugger, graphicREMEDY, http://www.gremedy.com/, Jul. 29, 2005.

(Continued)

*Primary Examiner* — Chun Cao
*Assistant Examiner* — Phil Nguyen

(57) ABSTRACT

A clock module is coupled in parallel to a number of data processing modules that are coupled in series. The data processing modules can be individually clock-gated. Each of the data processing modules can determine whether or not it can be placed into an idle state. To reduce power consumption, any subset of the data processing modules that are eligible to be placed in an idle state can be clock-gated. The remaining data processing modules can continue to receive clock signals from the clock module and thus can continue to process data.

18 Claims, 4 Drawing Sheets

U.S. PATENT DOCUMENTS

| | | | |
|---|---|---|---|
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 | 7/2008 | Chalfin et al. | |
| 7,401,242 B2 * | 7/2008 | Abernathy et al. | 713/320 |
| 7,420,563 B2 | 9/2008 | Wakabayashi | |
| 7,505,953 B2 | 3/2009 | Doshi | |
| 7,555,499 B2 | 6/2009 | Shah et al. | |
| 7,765,500 B2 | 7/2010 | Hakura et al. | |
| 7,778,800 B2 | 8/2010 | Aguaviva et al. | |
| 7,891,012 B1 | 2/2011 | Kiel et al. | |
| 2001/0034835 A1 | 10/2001 | Smith | |
| 2001/0044928 A1 | 11/2001 | Akaike et al. | |
| 2002/0157086 A1 | 10/2002 | Lewis et al. | |
| 2002/0175839 A1 * | 11/2002 | Frey | 341/50 |
| 2003/0043022 A1 | 3/2003 | Burgan et al. | |
| 2003/0120935 A1 | 6/2003 | Teal et al. | |
| 2003/0214660 A1 | 11/2003 | Plass et al. | |
| 2004/0085894 A1 | 5/2004 | Wang et al. | |
| 2004/0130552 A1 | 7/2004 | Duluk, Jr. et al. | |
| 2004/0158824 A1 | 8/2004 | Gennip et al. | |
| 2004/0162989 A1 | 8/2004 | Kirovski | |
| 2005/0198051 A1 | 9/2005 | Marr et al. | |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0047958 A1 | 3/2006 | Morais | |
| 2006/0079333 A1 | 4/2006 | Morrow et al. | |
| 2006/0080625 A1 | 4/2006 | Bose et al. | |
| 2006/0109846 A1 | 5/2006 | Lioy et al. | |
| 2006/0161761 A1 | 7/2006 | Schwartz et al. | |
| 2006/0185017 A1 | 8/2006 | Challener et al. | |
| 2007/0115292 A1 | 5/2007 | Brothers et al. | |
| 2007/0274284 A1 | 11/2007 | Dendukuri et al. | |
| 2008/0007563 A1 | 1/2008 | Aronson et al. | |
| 2008/0095090 A1 | 4/2008 | Lee et al. | |

OTHER PUBLICATIONS

C. Cebenoyan and M. Wloka, "Optimizing the Graphics Pipeline", 2003, Nvidia GDC Presentation Slide.

"maxVUE Graphic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

"ATI RADEON X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006), Reference 1; eHG.

N. Tatarchuk, "New RenderMonkey Features for DirectX and OpenGL Shader Development", Game Developers Conference, Mar. 2004.

gDEBugger, graphicREMEDY, http://www.gremedy.com/, Aug. 7, 2006.

A Relational Debugging Engine for the Graphics Pipeline, Duca et al., http://citeseer.ist.psu.edu/cache/papers/cs2/167/http:zSZzSzwww.cs.jhu.eduzSz~cohenszSzPublicationszSzgldb.pdf/a-relational-debugging-engine.pdf International Conference on Computer Graphics and Interactive Techniques, ACM Siggraph 2005, pp. 453-463, LA, ISSN: 0730-0301.

Jeffrey K. Hollingsworth and Barton P. Miller, "Dynamic Control of Performance Monitoring On Large Scale Parallel System", Jul. 23, 1993, ACM, "International Conference On Supercomputing" Proceedings of the 7th International Conference on Supercomputing, pp. 185-194.

Dror G. Feitelson and Larry Rudolph, "Toward Convergence In A Job Scheduling For Parallel Supercomputers", Aug. 1996, Springer, Job Scheduling Strategies For Parallel Proceedings: IPPS '96 workshop Honolulu, Hawaii, Apr. 16, 1996 proceedings.

Josh Lessard, "Profiling Concurrent Programs Using Hardware Counters", May 2005, University Of Waterloo, Thesis (abridged copy provided).

gDEBugger, graphicREMEDY, http://www.gremedy.com Jul. 29, 2005.

Graphic Remedy; gDEBugger screen shots; pp. 1-18.

* cited by examiner ness of a clock-gated series-coupled data processing modules.

CLOCK-GATED SERIES-COUPLED DATA PROCESSING MODULES

RELATED U.S. APPLICATION

This application is related to the copending U.S. patent application with Ser. No. 11/641,447, filed on Dec. 18, 2006, entitled "Method and Apparatus for Visualizing Component Workloads in a Unified Shader GPU Architecture," assigned to the assignee of the present invention, and hereby incorporated by reference.

FIELD

Embodiments according to the present invention generally relate to power management in limited-powered devices.

BACKGROUND

Power consumption is of particular concern in limited-power devices (e.g., battery-powered devices) such as laptop and notebook computer systems, cell phones, personal digital assistants (PDAs), portable media players, remote control units, hand-held devices including video game players, and the like. These devices are limited in size and weight and generally portable, and therefore they typically use smaller and lighter batteries of limited capacity. However, these types of devices may be used for a variety of computationally intensive and therefore power-hungry applications such as three-dimensional (3D) rendering and video encoding and decoding. As a result, such devices can usually be used only for relatively short periods of time before their batteries need to be recharged.

SUMMARY

According to embodiments of the present invention, a clock module is coupled in parallel to each of a number of series-coupled (e.g., pipelined) data processing modules, so that the data processing modules can be individually clock-gated. Each of the data processing modules can determine whether or not it is eligible to be placed into an idle state (e.g., clock-gated). To reduce power consumption, any subset of the data processing modules can be clock-gated. The remaining data processing modules can continue to receive clock signals from the clock module and thus can continue to process data.

In general, the clock signal to any of the data processing modules can be turned off or on without affecting the clock signal to any of the other data processing modules. Thus, even though the data processing modules are "closely coupled"—that is, an output of one module serves as an input to the next—the clock signal to each data processing module can be individually turned off/on in the manner described below. By turning off clock signals to these modules when they are not needed, power is conserved.

In one embodiment of the present invention, each data processing module incorporates, or is coupled to, an idle monitor that counts the number of clock cycles that a particular data processing module is idle. If the number of clock cycles exceeds a threshold value (which may be zero or more), then the data processing module is eligible to be placed in an idle state (e.g., the module can be clock-gated). The data processing module asserts a first signal to indicate it is eligible to be placed in the idle state. In one embodiment of the invention, an idle control module, which is coupled to each of the data processing modules in the pipeline, detects the first signal and decides whether or not the data processing module can be idled. In essence, the idle control module has access to the entire pipeline and thus can make a more informed decision then a data processing module can make by itself. The idle control module and the idle monitor can each be implemented in hardware.

To place a data processing module in the idle state, the idle control module asserts a second signal that is detected by the data processing module. The idle control module also asserts a third signal that is detected by the clock module. In response to the third signal, the clock module turns off the clock signal to the data processing module. In response to the second signal, the data processing module asserts a fourth signal. The data processing module can also preserve its internal state in response to the second signal. The fourth signal is used by the data processing module to flow control its input interfaces. In effect, the fourth signal is a "busy signal" that notifies, for example, the neighboring upstream data processing module that the data processing module is in the idle state. Generally speaking, when the fourth signal is asserted, any inputs (e.g., data or commands) to the data processing module are stalled.

A data processing module will remain in the idle state as long as the second signal is asserted. (The first signal may be de-asserted while the data processing module is in the idle state, which would effectively cause the second signal to de-assert. For example, although no state is changing in the data processing module when it is in the idle state, one of its inputs may change, which would cause the first signal to change.) The data processing module can be awakened when a data or command input is ready for the data processing module. The data processing module can quickly determine when it has an available input by detecting a change in state on one of its input interfaces. Alternatively, the idle control module can recognize when the data processing module needs to be awakened. To awaken the data processing module, the first, second, third and fourth signals are de-asserted in turn, the clock signal to the module is turned back on, the data processing module is resynchronized with the clock signal, and then the pending inputs can be received and processed.

Significantly, embodiments according to the present invention can be implemented in hardware without software intervention. Thus, additional power savings can be realized as a result of eliminating the software overhead. Also, implementation in hardware costs very little in terms of gates (area), so the benefit-to-cost ratio is very high.

Furthermore, the clock module can react very quickly—it may take only two to four clock cycles to turn off or turn on the clock signal to a data processing module. A hardware-based system such as that described herein can respond more quickly than software and thus can take advantage of this quickness. According to embodiments of the invention, it is possible to clock-gate a data processing module even if that data processing module can be idled for only a relatively short period of time. In contrast, by the time software readies the clock module to shut down a clock signal, the opportunity to idle the data processing module may already have passed. Although a hardware-based system may not be able to respond instantaneously, it can respond within a few clock cycles of that ideal. Thus, according to embodiments of the invention, a clock signal can be quickly turned off and on in order to closely track the activity level of a respective data processing module. Because the clock signal can be turned off for short periods of time as well as for longer periods of time, additional power savings are realized.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
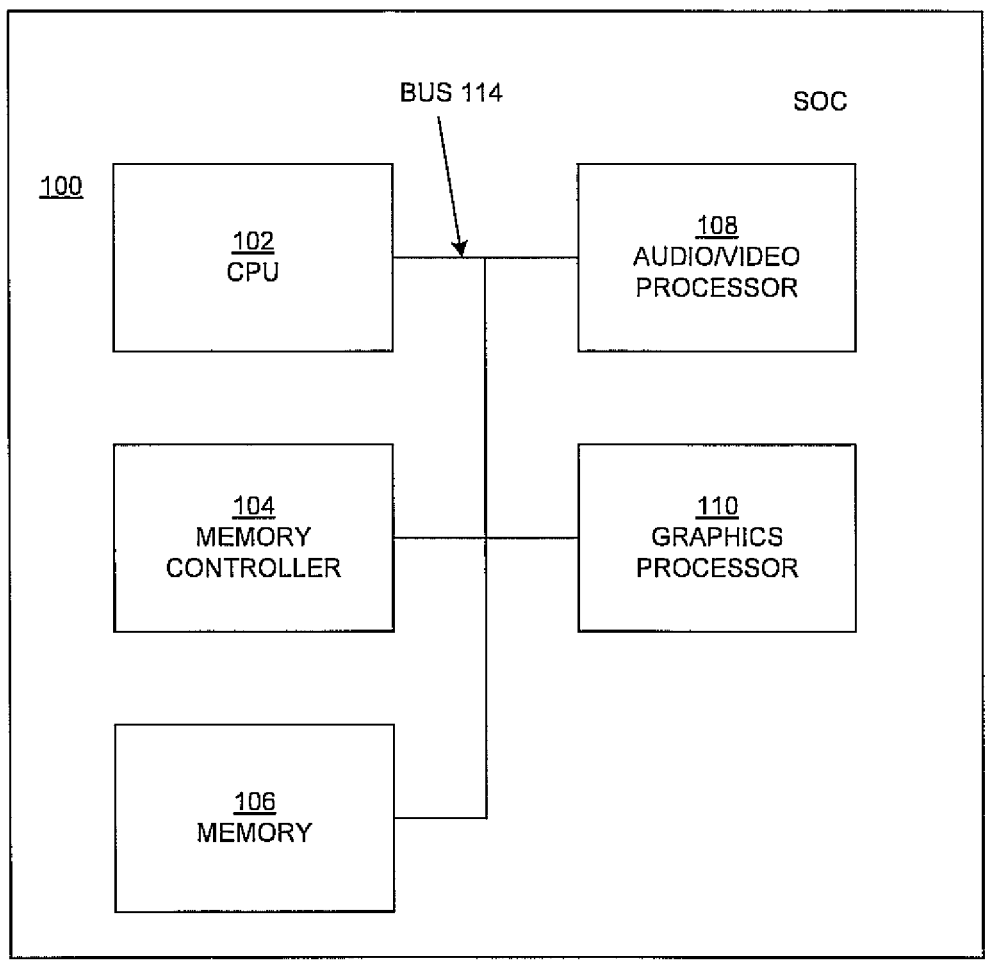
FIG. 1 is a block diagram showing an example of a computing system platform upon which embodiments according to the present invention may be implemented.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "providing," "clock-gating," "detecting," "asserting," "allowing," "sending," "receiving" "operating," "turning on/off," "permitting," "accumulating," "adjusting," "triggering stalling," "delaying," "monitoring" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram showing an example of a computing system platform 100 upon which embodiments according to the present invention may be implemented. FIG. 1 depicts the components of a basic system in accordance with embodiments of the present invention that provide the execution platform for certain hardware-based and software-based functionality. Embodiments in accordance with the present invention may be implemented on platforms that include functionality, components and devices other than those included in the system 100. The system 100 can be implemented as part of, for example, a battery-operated and/or portable device such as, but not limited to, a laptop or notebook computer system, cell phone, PDA, portable media player (an audio and/or video player), a remote control unit, a hand-held device such as a video game player, and the like. Embodiments in accordance with the present invention may be implemented on platforms that include functionality, components and devices other than (in addition to and/or in place of those included in the system 100.

In the FIG. 1 embodiment, the system 100, which may be a battery-operated and/or portable device, includes a central processing unit (CPU) or microprocessor 102, a memory controller 104, a main memory 106, and audio/video processor (AVP) 108 (e.g., a multimedia player or encoder/decoder), and a graphics (3D) processor 110. These elements are interconnected using one or more buses, exemplified by bus 114, such as an AMBA (Advanced Microprocessor Bus Architecture) High Speed Bus (AHB) and an AMBA Peripheral Bus (APB). Each of these elements, including the buses, may be driven using a different clock, although it is possible for different devices to be driven by the same clock. That is, a clock domain may include one or more devices, such that each of the devices in the clock domain receives the same frequency clock signal. Also, one clock domain (one or more devices) may be driven by one clock and another clock domain (one or more devices) may be driven by a different clock, such that the devices within either domain receive the same frequency clock signal, but different domains can receive clock signals of different frequencies. Moreover, within any clock domain, devices can be clock-gated independently of one another—for example, one device in a clock domain may be part of one clock tree and another device in the same clock domain may be part of another clock tree.

In one embodiment, the system 100 is implemented as a system-on-a-chip (SOC). In such an embodiment, all of the blocks in the system 100, including memory, are inside the SOC.

Figure 2:
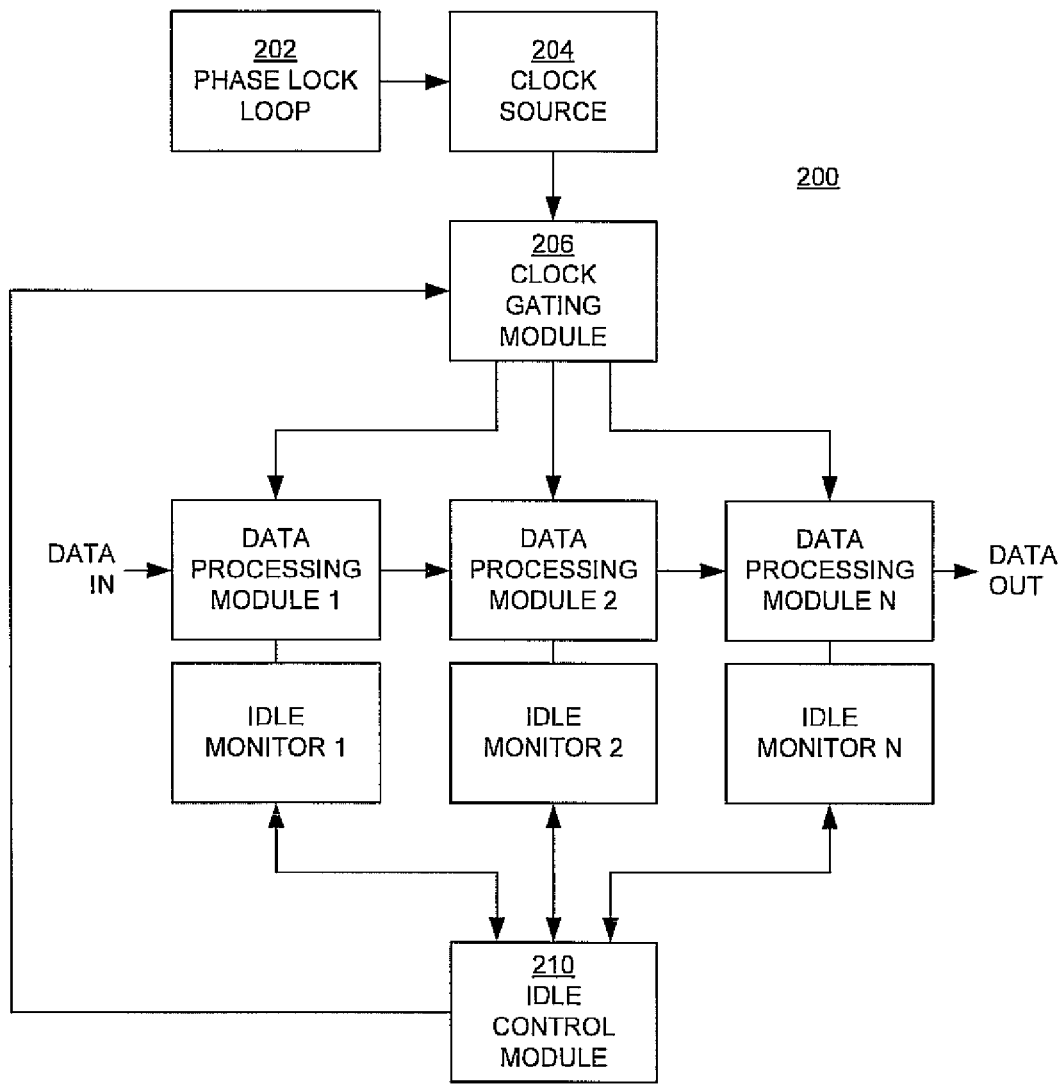
FIG. 2 is a block diagram showing a power management system according to one embodiment of the present invention.

FIG. 2 is a block diagram showing a power management system 200 according to one embodiment of the present invention. While certain components are shown as separate blocks in FIG. 2, the functionality provided by multiple blocks may be implemented within a single component. For example, the idle monitors 1, 2, . . . , N may be implemented as part of a respective data processing module 1, 2, . . . , N or as part of the idle control module 210. Additionally, the functionality provided by a particular block may be distributed across multiple blocks.

In the example of FIG. 2, a phase lock loop 202 drives a clock source 204, which may be the main clock for the system 100 (FIG. 1). The clock gating module 206, also referred to herein simply as the clock module, is a level 2 or intermediate clock source that distributes the main clock signal to other components within the system 100, in particular to data processing modules 1, 2, . . . , N. There may be other intermediate clock modules disposed between the data processing modules 1, 2, . . . , N and the clock source 204. Also, each data processing module 1, 2, . . . , N includes a free running clock (not shown).

Continuing with reference to FIG. 2, the data processing modules 1, 2, . . . , N are coupled in series to form a pipeline. These modules may be implemented as hardware processing blocks. By way of example, the data processing modules 1, 2, . . . , N may be parts of the AVP 108 (FIG. 1). For example, the first data processing module may perform front-end parsing of incoming video data; the second might perform spatial transformations on the data output from the first; the third might perform motion/temporal compensation on the output of the second; and the fourth might perform post-processing on the output of the third. In general, an output of an upstream data processing module (e.g., module 1) is an input to the neighboring downstream data processing module (e.g., module 2). For some types of processing, a particular data processing module may be skipped. Each data processing module may perform a specialized function on a data stream and, functionally, may be closely coupled to the adjoining (upstream and downstream) data processing modules. While the data in the data stream may be transformed as it proceeds from one data processing module to the next, each data processing module is in essence acting on the same data stream—the data processing modules are acting in concert to process the same data stream. Although the data processing modules 1, 2, . . . , N are coupled in pipeline fashion, they do not need to operate in lock step with one another.

The clock module 206 of FIG. 2 is coupled in parallel to each of the data processing modules 1, 2, . . . , N. That is, the clock module 206 can provide a separate clock signal to each data processing module 1, 2, . . . , N. Each data processing module can be individually clock-gated independent of the other data processing modules. For example, the clock signal to one or more data processing modules can be turned off while the clock signals to the remaining data processing modules are kept on. Subsequently, the clock signal to another data processing module can be turned off while the clock signals to other data processing modules are kept on, and so on. In the meantime, the clock signals to one or more data processing modules can be turned on without turning on the clock signals to all of the data processing modules. By clock-gating a data processing module, power is saved—the module is inactive, thus saving power, and also power is saved within the clock distribution network (e.g., along the routing between the clock module 206 and the data processing module).

In general, each data processing module 1, 2, . . . , N incorporates, or is coupled to, logic that can be used to determine when the module is idle, as measured against a specified threshold or condition. In the example of FIG. 2, this logic is represented as idle monitors 1, 2, . . . , N. In one embodiment of the invention, the idle monitors 1, 2, . . . , N are implemented in hardware.

For clarity, the following discussion refers to a single idle monitor and data processing module, although there may be multiples of both. The idle monitor 1 counts the number of consecutive idle clock cycles (the number of consecutive clock cycles that the data processing module 1 is idle). A clock cycle can be considered an idle clock cycle if one or more specified conditions are met during the clock cycle. Those conditions can include, but are not limited to: the data processing module has data for a downstream data processing module but the downstream data processing module cannot accept the data; the data processing module is ready to accept data from an upstream data processing module but data is unavailable; and/or the data processing module does not currently have a command from an external processor (e.g., CPU 102 of FIG. 1). As another example of a potential idle condition, the processing function performed by a data processing module may not be needed to process the data stream currently being processed in the pipeline, and so that data processing module can be idled while other data processing modules are executing. As yet another example, a data processing module may need to access a memory (e.g., memory 106 of FIG. 1), tangential to the flow of data through the pipeline; while that data is being retrieved, the data processing module may be eligible for idling. Different conditions can be applied to different data processing modules.

With reference again to FIG. 2, the idle monitor 1 can include a register that holds the count value (the number of idle clock cycles). In one embodiment of the invention, the number of idle clock cycles is compared against a specified threshold value. For ease of implementation, the threshold value may be a power-of-two value. If the number of idle clock cycles exceeds the threshold value, then the data processing module 1 is eligible to be placed in an idle state. In the idle state, the clock signal from the clock module 206 to the data processing module is turned off. The application of a threshold value avoids situations in which the data processing module is idle for a very small number of cycles. More specifically, some number of clock cycles will pass while the clock signal to the data processing module is being turned off, and an additional number of clock cycles will also pass while the clock signal to the data processing module is being turned back on. Still more clock cycles may pass before the data processing module is able to resume data processing. The threshold value can be set high enough to avoid situations in which the data processing module is idle for a number of clock cycles that is less than the number of clock cycles it takes to turn off then turn back on the clock signal to the data processing module. Different threshold values can be applied to different data processing modules.

In one embodiment of the invention, each threshold value is set in software and can be subsequently adjusted (increased or decreased). For example, historical data can be collected and statistically evaluated to determine whether a threshold value for a particular data processing module is too high or too low. Also, a threshold value may be changed dynamically to allow tradeoffs between performance and power savings.

In one embodiment of the invention, an idle control module 210 is coupled to each of the data processing modules 1, 2, ..., N and also to the clock module 206. As will be seen, the idle control module 210 can receive signals from the data processing modules/idle monitors and can assert a signal that turns the clock signal to a data processing module off (e.g., if that data processing module is eligible to be placed in an idle state). Because the idle control module 210 is coupled to each of the data processing modules 1, 2, ..., N, it can make an informed decision whether or not to place an eligible data processing module into the idle state. Also, as elaborated on below, the idle control module 210 has a role in re-establishing clock signals to clock-gated data processing modules.

For example, a particular data processing module may "think" it is eligible for the idle state because, for example, it does not have data to work on. However, the idle control module 210 can recognize that another data processing module has data for that data processing module, and that the data is due to arrive before the particular data processing module can be idled (e.g., clock-gated) and then awakened. Thus, the idle control module 210 may decide that it is not advantageous to place the particular data processing module in the idle state, even if the data processing module appears to be eligible for the idle state.

Generally speaking, under some circumstances, a data processing module that is eligible to be placed into an idle state may not be placed into the idle state. Based on the information obtained via its respective idle monitor 1, 2, ..., N, each of the data processing modules 1, 2, ..., N has enough information to identify itself as a candidate to be placed into the idle state. However, in one embodiment of the invention, the idle control module 210 makes the decision whether an eligible data processing module is actually placed into the idle state.

Figure 3:
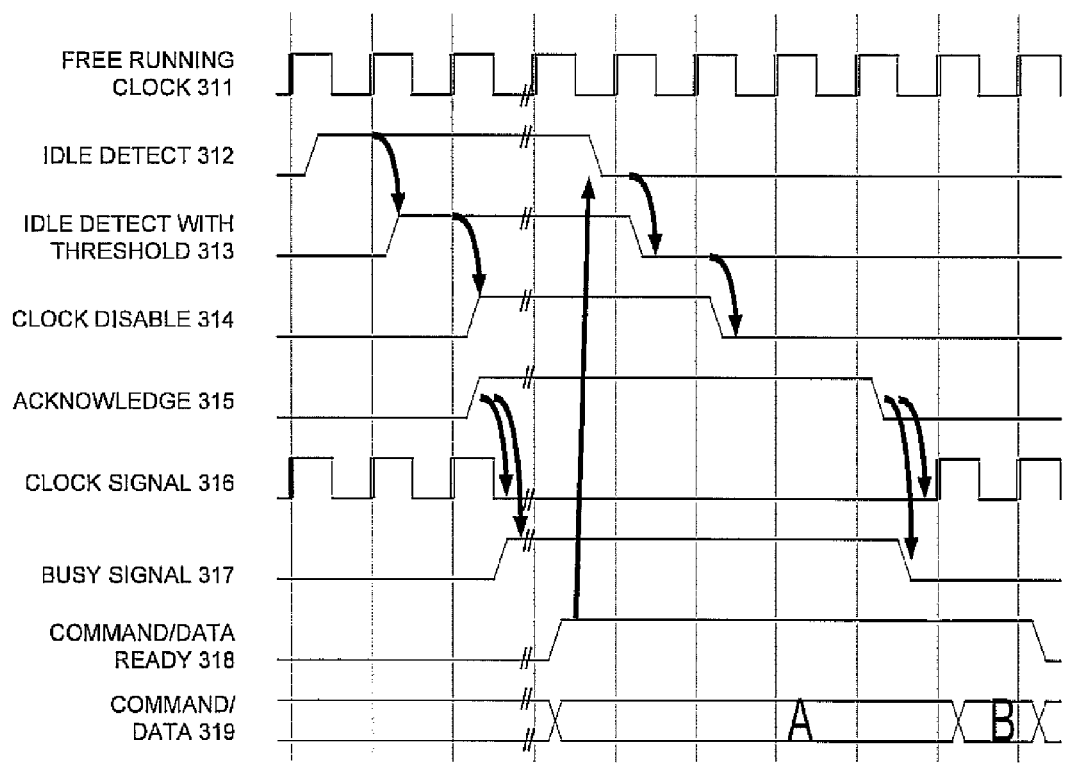
FIG. 3 shows a variety of signals that can be used by a power management system according to one embodiment of the present invention.

FIG. 3 shows a variety of signals that can be used by a power management system (e.g., the system 200 of FIG. 2) according to one embodiment of the present invention. FIG. 3 is described in conjunction with FIG. 2. For clarity, the following discussion refers to a single data processing module (e.g., data processing module 2); however, that discussion can be readily extended to the plural.

The clock signal from the data processing module's free running clock is represented as the signal 311, and the clock signal from the clock module 206 is represented as the signal 316. During periods in which the clock signal 316 from the clock module 206 is turned off, the free running clock continues to run.

The idle detect signal 312 is asserted when the data processing module 2 experiences an idle clock cycle. As described above, a clock cycle can be considered an idle clock cycle if one or more specified conditions (such as those listed previously herein) are met during the clock cycle.

The idle detect with threshold signal 313 is asserted if the number of consecutive idle clock cycles exceeds a threshold value. In the example of FIG. 3, the threshold value is zero—the signal 313 is asserted after a single idle clock cycle is detected. If, for example, a threshold value of four (4) cycles was specified instead, then the signal 313 would be asserted after 4 consecutive idle clock cycles had been detected. The signal 313 can be asserted by either the data processing module 2 or its corresponding idle monitor.

The asserted signal 313 is detected by the idle control module 210. In the example of FIG. 3, in response to the assertion of the signal 313, the idle control module 210 asserts the clock disable signal 314 and the acknowledge signal 315. As described above, there may be instances in which the idle control module 210 does not decide to place the data processing module 2 in an idle state. In those instances, the signals 314 and 315 are not asserted.

The asserted signal 314 is detected by the clock module 206. In response to the assertion of the signal 314, the clock module 206 turns off the clock signal 316 to the data processing module 2. Significantly, other data processing modules can continue to receive a clock signal from the clock module 206 even though the clock signal 316 to the data processing module 2 is turned off. Thus, even though the data processing module 2 is idled, other parts of the pipeline can continue to function.

The asserted acknowledge signal 315 is detected by the data processing module 2. When the signal 315 is asserted, the data processing module 2 enters the idle state and will remain in the idle state until the signal 315 is de-asserted. Note that the signal 313 may be de-asserted while the data processing module 2 is in the idle state, which would effectively cause the signal 315 to de-assert. For example, although no state is changing in the data processing module 2 when it is in the idle state, one of its inputs may change, which would cause the signal 313 to change.

In one embodiment of the invention, some or all of the data processing modules have the capability to flow control their input interfaces while other data processing modules may not. Data processing modules with flow control capability can stall their input interfaces by asserting the busy signal 317 in response to assertion of the acknowledge signal 315. While the busy signal 317 is asserted, the data processing module 2 cannot receive input data from the neighboring upstream data processing module 1. The idle control module 210 controls (e.g., shuts off) the input interfaces of data processing modules that do not have flow control capability.

Upon entering the idle state, the internal state of the data processing module 2 is preserved for the duration of the idle state. In the idle state, the data processing module 2 is clock-gated but continues to be powered (it is not power-gated). Accordingly, clocked circuit elements (e.g., flip-flops and latches) in the data processing module 2 will not change state while the data processing module is in the idle state. In essence, the data processing module 2 stays in the state it was in when the acknowledge signal 315 was asserted, except for the assertion of the busy signal 317. Thus, for example, if the data processing module 2 is idled because it has data for a downstream data processing module but the downstream data processing module cannot accept the data, then the data inside the data processing module 2 will be preserved while the module is in the idle state.

In the example of FIG. 3, while the data processing module 2 is idled, a command/data ready signal 318 is asserted when a command/data 319 (e.g., word A) is ready to be input to the data processing module. Consequently, the data processing module 2 needs to be awakened to handle the command/data 319. In one embodiment of the invention, the data processing module 2 detects the assertion of the signal 318 and begins the wakeup sequence. Alternatively, the idle control module 210 can detect the signal 318 assertion and begin the wakeup sequence.

In the wakeup sequence, the signals 312, 313 and 314 are de-asserted in turn. When the signal 314 is de-asserted, the clock module 206 turns on the clock signal 316 to the data processing module 2. However, as mentioned above, the data processing module 2 will remain in the idle state as long as the signal 315 is asserted. In one embodiment of the invention, the signal 315 remains asserted for a number of clock cycles (e.g., two clock cycles) after the clock signal 316 is turned back on, to allow time for the data processing module 2 to resynchronize with the clock signal (e.g., to allow time for the clock signal 316 to propagate to and through the data processing module). The signal 315 can then be de-asserted, and the signal 317 is de-asserted as well. When the signal 317 is de-asserted, the input interfaces of the data processing module 2 are reopened. The command/data 319 (e.g., data word A) is held until the clock signal 316 is restored. As mentioned above, any internal state was preserved when the data processing module 2 entered the idle state, and so when the clock signal 316 is restored, the data processing module effectively picks up where it left off.

Figure 4:
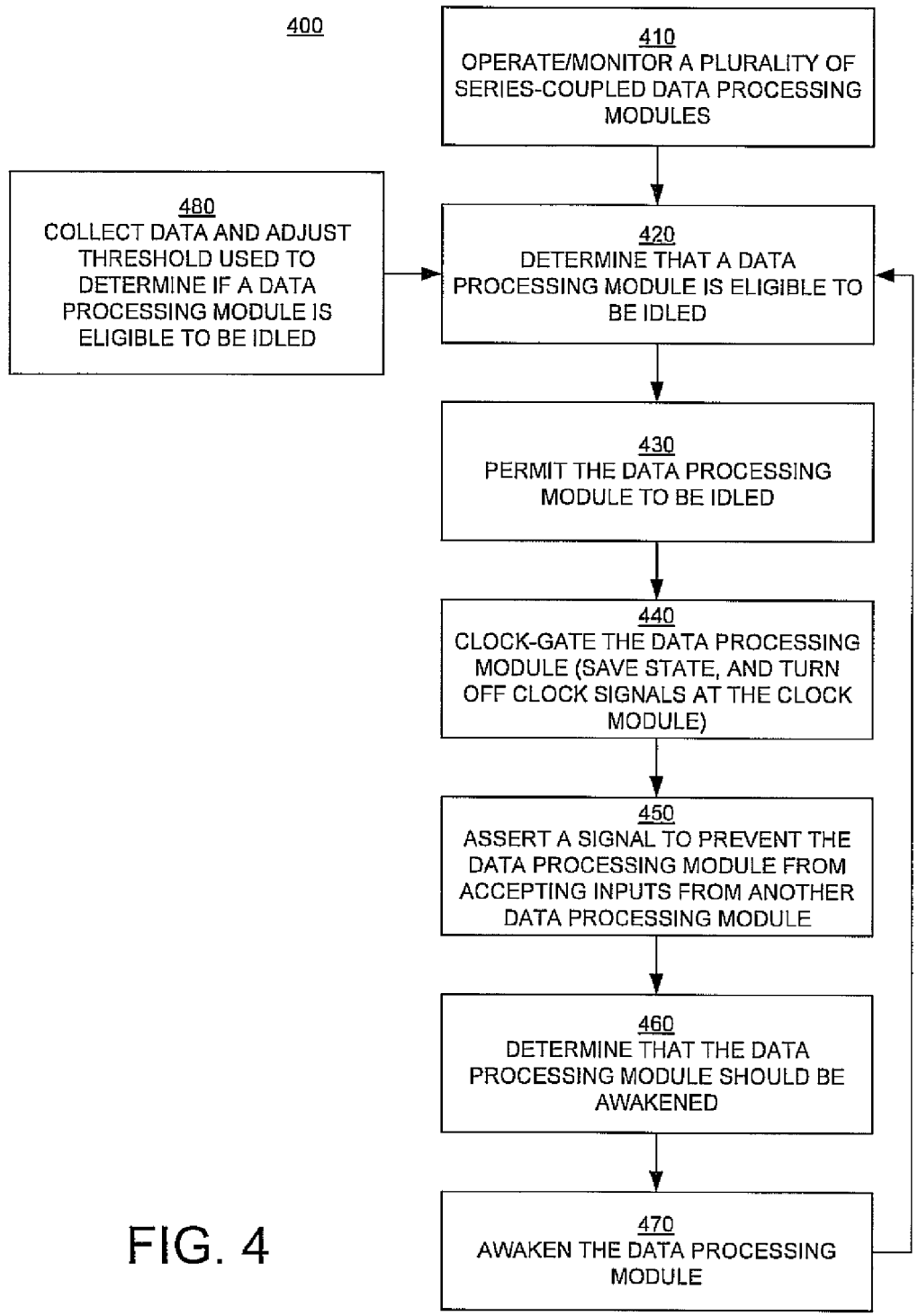
FIG. 4 is a flowchart of a computer-implemented power management method in one embodiment in accordance with the present invention.

FIG. 4 is a flowchart 400 of a computer-implemented power management method in accordance with an embodiment of the present invention. Although specific steps are disclosed in the flowchart 400, such steps are exemplary. That is, embodiments of the present invention are well-suited to performing various other steps or variations of the steps recited in the flowchart 400. FIG. 4 is discussed in conjunction with FIGS. 2 and 3.

The method of flowchart 400 can be selectively turned on and off. That is, as described herein, the data processing modules 1, 2, . . . , N can be independently clock-gated under certain conditions. In some situations, as described above, the idle control module 210 may decide not to clock-gate a data processing module. Also, in some situations (for some use cases), a decision may be made to turn off the clock-gating feature described herein on a module-by-module basis or across the entire pipeline.

In block 410, a number of data processing modules 1, 2, . . . , N are operated and monitored. The data processing modules are coupled in series, such that an output of an upstream module is an input to a downstream module.

In block 420, a data processing module determines that it is eligible to be placed into an idle state. As previously described herein, an idle monitor associated with the data processing module can count the number of clock cycles during which the data processing module is idle. If that number exceeds a threshold (which may be zero), then the data processing module is eligible to be placed into the idle state. When the data processing module is eligible for the idle state, it asserts a signal 313 (which may be referred to below as the first signal).

Significantly, the data processing module can, by itself, make the determination that it is eligible for the idle state. Also, this determination can be made in hardware without software intervention (e.g., without an a priori software instruction). That is, for example, the data processing module is not instructed to enter the idle state by setting a bit (e.g., a kill bit or a conditional execute bit) in advance. Instead, the data processing module (specifically, the idle monitor) counts its idle clock cycles and flags its eligibility accordingly.

In block 430, an idle control module 210 can detect the signal 313. If the idle control module 210 decides that the candidate data processing module can be placed into the idle state, then the idle control module asserts a signal 315 (which may be referred to below as the second signal).

In block 440, if the idle control module 210 decides that the candidate data processing module can be placed into the idle state, then the idle control module also asserts a signal 314 (which may be referred to below as the third signal). In response to the signal 314, the clock module 206 turns off the clock signal to the data processing module.

In block 450, while the signal 314 is asserted, the data processing module asserts a signal 317 (which may be referred to below as the fourth signal). While the signal 317 is asserted, the data processing module is prevented from receiving inputs from another (e.g., upstream) data processing module.

In block 460, a determination is made that the data processing module should be awakened. For example, the presence of an input (data or command) at an input interface of the data processing module may be detected by the data processing module itself or by the idle control module 210.

In block 470, the data processing module is awakened. More specifically, the first, second, third and fourth signals (at least) are de-asserted in turn, resulting in the clock signal being restored to the data processing module. The data processing module is resynchronized with the clock signal, and then the pending inputs can be received and processed.

In block 480, in one embodiment of the invention, data can be collected and statistically evaluated to determine whether the threshold value applied in block 420 should be increased or decreased.

In summary, a clock signal to any (one or more) data processing module(s) in a number of series-coupled data processing modules can be turned off or on without affecting the clock signal to any of the other data processing modules. Even though the data processing modules are closely coupled—that is, an output of one module serves as an input to the next—the clock signal to each data processing module can be individually turned off/on in the manner described herein. By turning off clock signals when they are not needed, power is conserved.

Significantly, embodiments according to the present invention can be implemented in hardware without software intervention. Thus, additional power savings can be realized as a result of eliminating the software overhead. Also, implementation in hardware costs very little in terms of gates (area), so the benefit-to-cost ratio is very high. Furthermore, the clock module can react very quickly—it may take only two to four clock cycles to turn off or turn on the clock signal to a data processing module. A hardware-based system such as that described herein can respond more quickly than software can when, for example, determining the suitability to enter a reduced power state, and thus a hardware-based system can take advantage of the clock module's quickness. As a result, it is possible to clock-gate a data processing module even if that data processing module can be idled for only a relatively short period of time. Thus, according to embodiments of the invention, a clock signal can be quickly turned off and on in order to closely track the activity level of a respective data processing module. Because the clock signal can be turned off for short periods of time as well as for longer periods of time, additional power savings are realized.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power management system comprising:
a plurality of data processing modules coupled in series, wherein each of said data processing modules is operable for individually determining whether it is eligible to be placed into an idle state;
a clock module coupled in parallel to each of said data processing modules, wherein said clock module is operable to turn off clock signals to any subset of said data processing modules eligible for said idle state while continuing to provide clock signals to any other of said data processing modules; and
a controller module operable for detecting signals from said plurality of data processing modules, wherein said signals comprise a first signal asserted by a first data processing module, said first signal indicating that said first data processing module has determined it is eligible to be placed in said idle state, wherein further said controller module optionally asserts a second signal in response to said first signal, wherein said second signal is asserted if said controller module determines that said first data processing module is allowed to enter said idle state, and wherein said controller module does not assert said second signal if said controller module determines that said first data processing module will receive data from an upstream data processing module before said first data processing module can be placed in said idle state and then awakened.

2. The system of claim 1 wherein said first data processing module determines whether it is eligible to be placed in said idle state in hardware based on an up-to-date measure of idleness.

3. The system of claim 1 wherein said first signal is asserted when said first data processing module is idle for a specified number of clock cycles.

4. The system of claim 3 wherein said first data processing module is idle if a condition is satisfied for said specified number of clock cycles, wherein said condition is selected from the group consisting of: said first data processing module has data for a downstream data processing module but said downstream data processing module cannot accept said data; said first data processing module is ready to accept data from said upstream data processing module but said data is unavailable; said first data processing module does not have a command from an external processor; a processing function performed by said first data processing module is not needed to process a data stream that is being processed by said plurality of data processing modules; and the first data processing module is waiting for data accessed from an external memory.

5. The system of claim 1 wherein said controller module asserts a third signal in response to said first signal, wherein further said clock module turns off a clock signal to said first data processing module in response to said third signal.

6. The system of claim 1 wherein a fourth signal is asserted while said second signal is asserted, wherein said first data processing module is prevented from receiving inputs from said upstream data processing modules while said fourth signal is asserted.

7. The system of claim 1 wherein a state of said first data processing module when said first data processing module enters said idle state is preserved.

8. The system of claim 1 wherein said clock module is disposed between said plurality of data processing modules and a clock source.

9. A method comprising:
operating a data processing pipeline comprising a plurality of data processing modules coupled in series and including a first data processing module, wherein each of said data processing modules is operable for receiving a clock signal from a shared clock module and wherein each of said data processing modules monitors a measure of its idleness, wherein further said clock module is operable to turn off clock signals to any subset of said data processing modules eligible for an idle state while continuing to provide clock signals to any other of said data processing modules, wherein said first data processing module asserts an idle detect with threshold signal to indicate that said first data processing module has determined it is eligible to be placed in said idle state, wherein a controller module receives said idle detect with threshold signal and, in response, optionally asserts a clock disable signal, wherein said clock disable signal is asserted if said controller module determines that said first data processing module is allowed to enter said idle state, and wherein said controller module does not assert said clock disable signal if said controller module determines that said first data processing module will receive data from an upstream data processing module before said first data processing module can be placed in said idle state and then awakened; and
selectively turning off said a clock signal to said first data processing module, wherein said clock signal to said first data processing module is turned off if said clock disable signal is asserted by said controller module and is not turned off if said clock disable signal is not asserted by said controller module.

10. The method of claim 9 further comprising permitting said first data processing module to enter said idle state, wherein said first data processing module asserts a busy signal that stalls inputs to said first data processing module while said busy signal is asserted.

11. The method of claim 9 further comprising said first data processing module determining its eligibility for said idle state in hardware based on a current measure of idleness and without an a priori software instruction.

12. The method of claim 11 wherein said first data processing module is ready for said idle state if said first data processing module is idle for a threshold number of clock cycles.

13. The method of claim 12 further comprising:
accumulating historical data comprising a number of clock cycles that said first data processing module is idle; and
adjusting said threshold number of clock cycles based on said historical data.

14. A method comprising:
monitoring a plurality of data processing modules coupled in a pipeline, wherein outputs of an upstream module in said pipeline comprise inputs to a downstream module in said pipeline, said plurality of data processing modules comprising a first data processing module and a second data processing module coupled to a controller module;

detecting a first signal asserted by said first data processing module, said first data processing module determining that it is eligible to be placed into an idle state and then asserting said first signal in response to said determining; and in response to said first signal, optionally placing said first data processing module in said idle state by clock-gating said first data processing module at a clock module that is coupled to each of said data processing modules, wherein said second data processing module continues to receive clock signals from said clock module if said first data processing module is clock-gated, wherein said first data processing module is clock-gated if said controller module determines that said first data processing module is allowed to enter said idle state, and wherein said first data processing module is not clock-gated if said controller module determines that said first data processing module will receive data from an upstream data processing module before said first data processing module can be placed in said idle state and then awakened.

15. The method of claim 14 further comprising asserting a second signal that is detected by said first data processing module, said second signal allowing said first data processing module to enter said idle state.

16. The method of claim 14 further comprising asserting a signal that is detected by said clock module and triggers said clock-gating of said first data processing module.

17. The method of claim 14 further comprising asserting a signal that stalls inputs to said first data processing module while said signal is asserted.

18. The method of claim 14 further comprising determining that said first data processing module satisfies a condition, wherein said first data processing module is ready for said idle state if said condition is satisfied, wherein further said condition corresponds to a threshold number of clock cycles.

* * * * *